United States Patent [19]
Okutani et al.

[11] Patent Number: 5,051,677
[45] Date of Patent: Sep. 24, 1991

[54] APPARATUS FOR PROCESSING ROTARY MEMBER

[75] Inventors: Norio Okutani, Neyagawa; Koichi Nakazawa, Amagasaki, both of Japan

[73] Assignee: Matsushita Electric Industrial Co., Ltd., Osaka, Japan

[21] Appl. No.: 634,551

[22] Filed: Dec. 27, 1990

[30] Foreign Application Priority Data

Dec. 29, 1989 [JP] Japan ................................. 1-341534

[51] Int. Cl.⁵ ............................................ G05B 19/25
[52] U.S. Cl. .................................... 318/573; 318/560; 318/603; 360/86
[58] Field of Search ............... 318/560, 562, 573, 594, 318/600, 602, 603, 628, 634; 360/72.1, 72.2, 86

[56]     References Cited
         U.S. PATENT DOCUMENTS

| | | | |
|---|---|---|---|
| 4,021,714 | 5/1977 | Jones et al. | 318/594 |
| 4,374,351 | 2/1983 | Fishman et al. | 318/600 |
| 4,782,404 | 11/1988 | Baba | 318/634 |
| 4,849,680 | 7/1989 | Miyamoto | 318/602 |
| 4,965,502 | 10/1990 | Oyasawara | 318/628 |

Primary Examiner—William M. Shoop, Jr.
Assistant Examiner—Larry Moskowitz
Attorney, Agent, or Firm—Wenderoth, Lind & Ponack

[57]     ABSTRACT

An apparatus for processing a rotary member, comprising: a rotational drive for driving the rotary member so as to rotate the rotary member about an axis of the rotary member; an encoder for detecting a rotational position of the rotational drive device; a control device for controlling, in response to an output signal of the encoder, the rotational drive device so as to rotate the rotational drive device at a uniform speed; a processing device for processing an arbitrary position of the rotary member rotating at the uniform speed; a position detecting device for detecting, on the basis of the output signal of the encoder, a rotational position of the rotary member by raising a resolution of the output signal of the encoder; and a processing control device for controlling the processing device on the basis of the rotational position of the rotary member detected by the position detecting device.

4 Claims, 3 Drawing Sheets

APPARATUS FOR PROCESSING ROTARY MEMBER

BACKGROUND OF THE INVENTION

The present invention relates to an apparatus for processing a rotary member, which is suitable for highly accurately performing various workings on the rotary member, inspection of the worked portions of the rotary member, etc. as in the case of writing of bits on a laser disk or its inspection.

Conventionally, in, for example, an apparatus for inspecting bits written on a laser disk, the laser disk is mounted on a predetermined support portion so as to be driven for rotation about its axis by a rotational drive means such as an air spindle motor. Furthermore, rotational position of the rotational drive means is detected by an encoder and is controlled by a rotational control means such as a PLL (phase locked loop) control means such that the rotational drive means is rotated at a uniform speed. Meanwhile, in order to cope with planar and axial run-outs of the laser disk, a detecting optical head is provided on a two-dimensional actuator so as to perform focus servo control or tracking servo control of the laser disk. Moreover, in order to prevent nonuniform rotations of the laser disk due to external vibrations, the apparatus is mounted on a damping base.

As shown in FIG. 1, a detection signal outputted from an optical head is analyzed by a signal analysis means such that positions of bits written on the laser disk are detected. Namely, since the laser disk is subjected to PLL control so as to be rotated at a highly accurately uniform speed, positions of bits written on the laser disk are inspected by analyzing the detection signal in timing axis on the assumption that the laser disk is rotated at a completely uniform speed.

However, even if the laser disk is subjected to high precision speed control such as PLL control, it is impossible to rotate the laser disk at a completely uniform speed. Furthermore, nonuniform rotations of the laser disk directly result in deterioration of detection accuracy of positions of bits written on the laser disk. Moreover, in order to more completely eliminate external vibrations causing such nonuniform rotations of the laser disk, it becomes necessary to provide a complicated and expensive damping base, thereby resulting in rise of production cost of the apparatus.

SUMMARY OF THE INVENTION

Accordingly, an essential object of the present invention is to provide, with a view to eliminating the above mentioned disadvantages inherent in the conventional apparatus, an apparatus for processing a rotary member, which is capable of highly accurately performing working, inspection, etc. on the rotary member and can be produced at low cost.

In order to accomplish this object of the present invention, an apparatus for processing a rotary member, according to the present invention comprises: a rotational drive means for driving the rotary member so as to rotate the rotary member about an axis of the rotary member; an encoder for detecting a rotational position of the rotational drive means; a control means for controlling, in response to an output signal of the encoder, the rotational drive means so as to rotate the rotational drive means at a uniform speed; a processing means for processing an arbitrary position of the rotary member rotating at the uniform speed; a position detecting means for detecting, on the basis of the output signal of the encoder, a rotational position of the rotary member by raising a resolution of the output signal of the encoder; and a processing control means for controlling the processing means on the basis of the rotational position of the rotary member detected by the position detecting means.

The position detecting means can be constituted by a counter for counting pulse signals outputted from the encoder, an interpolation means for performing interpolation between the pulse signals from a duration and a period of the pulse signals and a position calculating means for calculating the rotational position of the rotary member on the basis of output signals of the counter and the interpolation means.

In the apparatus for processing the rotary member, according to the present invention, the rotary member is driven for rotation at a substantially uniform speed by the rotational drive means controlled by the control means and the processing means for processing the rotary member is controlled on the basis of the rotational position of the rotary member detected by the position detecting means capable of detecting the rotational position of the rotary member at high resolution. Therefore, even if minute nonuniform rotations of the rotary member happen, the rotary member can be processed at remarkably high precision. Meanwhile, since minute nonuniform rotations of the rotary member are permissible, a relatively inexpensive damping base of simple construction can be employed for eliminating external vibrations, thereby resulting in reduction in production cost of the apparatus.

Furthermore, in the position detecting means, when the pulse signals outputted from the encoder are counted by the counter and time sharing is performed between the pulse signals such that the rotational position of the rotary member is detected, necessary response characteristics can be obtained by a simple circuit arrangement. Moreover, since the rotary member is rotated at substantially uniform speed and can be regarded as rotating at completely uniform speed in a minute rotational range between the pulse signals outputted from the encoder, it becomes possible to detect position of the rotary member at high precision. In addition, such an undesirable phenomenon does not take place that the signal outputted from the encoder is affected by accuracy of its wave form as in the case where the signal outputted from the encoder is multiplied so as to have higher resolution.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
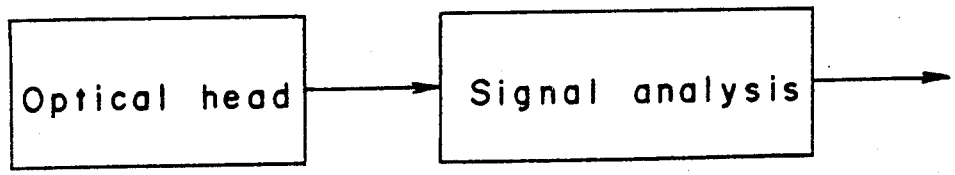
FIG. 1 is a block diagram of a prior art detection signal processing apparatus (already referred to)

Referring now to the drawings, there is shown in FIGS. 2 to 6, an inspection apparatus for a laser disk, according to one embodiment of the present invention. Initially, a whole arrangement of the inspection apparatus is described with reference to FIG. 3. An air spindle motor 2 is provided on an inexpensive damping base 1 of relatively simple construction such that a spindle 3 of the air spindle motor 2 projects vertically and upwardly. A support member 4 is mounted on an upper end portion of the spindle 3 such that a laser disk 5 is gripped between the support member 4 and a clamp means 6 coaxially with the spindle 3. Meanwhile, the air spindle motor 2 is provided with an encoder 7 for detecting rotational position of the air spindle motor 2. On the other hand, an optical head 8 for detecting bits written on the laser disk 5 is mounted on a two-dimensional actuator 9 which is movable through a minute distance vertically and radially relative to the laser disk 5. The two-dimensional actuator 9 is provided on a feed head 10 which is movable in a radial direction of the laser disk 5 so as to select a specific track on the laser disk 5. The feed head 10 is provided, through a head base 11, on the damping base 1.

Figure 4:
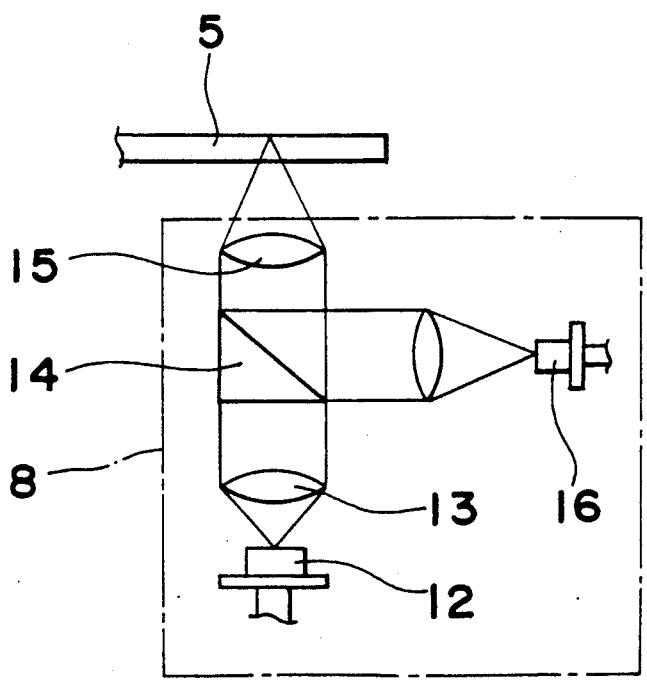
FIG. 4 is a schematic view of an optical head employed in the inspection apparatus of FIG. 2.

As shown in FIG. 4, the optical head 8 includes a laser diode 12 for emitting a laser beam, a collimator lens 13, a beam splitter 14, an objective lens 15 and a photodiode 16. The laser beam outputted from the laser diode 12 is converted into parallel light by the collimator lens 13. Then, the parallel light is irradiated, via the beam splitter 14, onto the specific track of the laser disk 5 by the objective lens 15. Its reflected light from the laser disk 5 is detected by the photodiode 16 via the objective lens 15 and the beam splitter 14.

Figure 5:
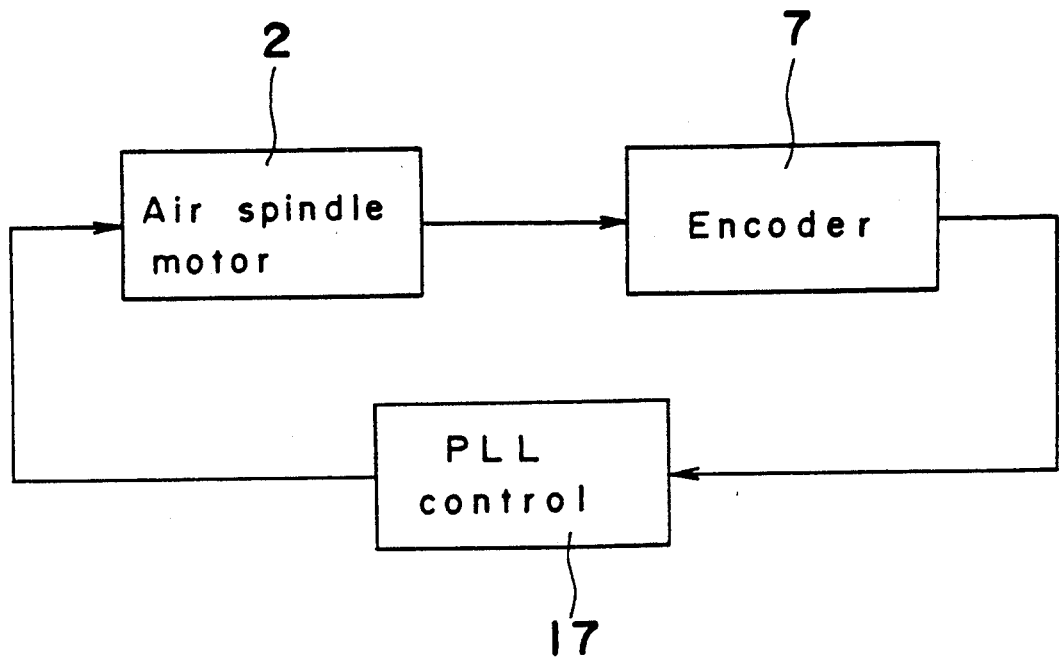
FIG. 5 is a control block diagram of a rotational drive means employed in the inspection apparatus of FIG. 2.
Figure 6:
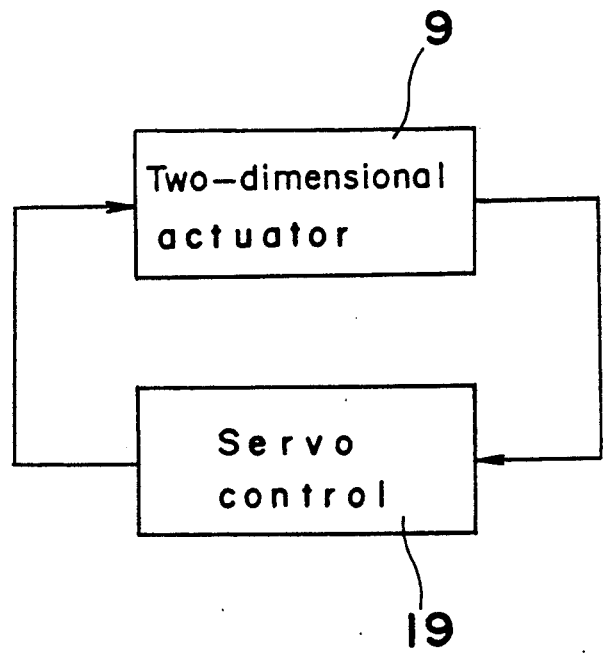
FIG. 6 is a control block diagram of a two-dimensional actuator employed in the inspection apparatus of FIG. 2.

As shown in FIG. 5, the air spindle motor 2 is controlled by a PLL (phase locked loop) control means 17 on the basis of pulse signals outputted from the encoder 7 so as to be rotated at highly accurately uniform speed. Meanwhile, as shown in FIG. 6, the two-dimensional actuator 9 is controlled by a focusing and tracking servo control means 19 such that the laser beam outputted from the optical head 8 is accurately irradiated onto the desired track of the laser disk 5 even if planar or axial run-out of the laser disk 5 is produced due to minute adjustments of position of the optical head 8.

Figure 2:
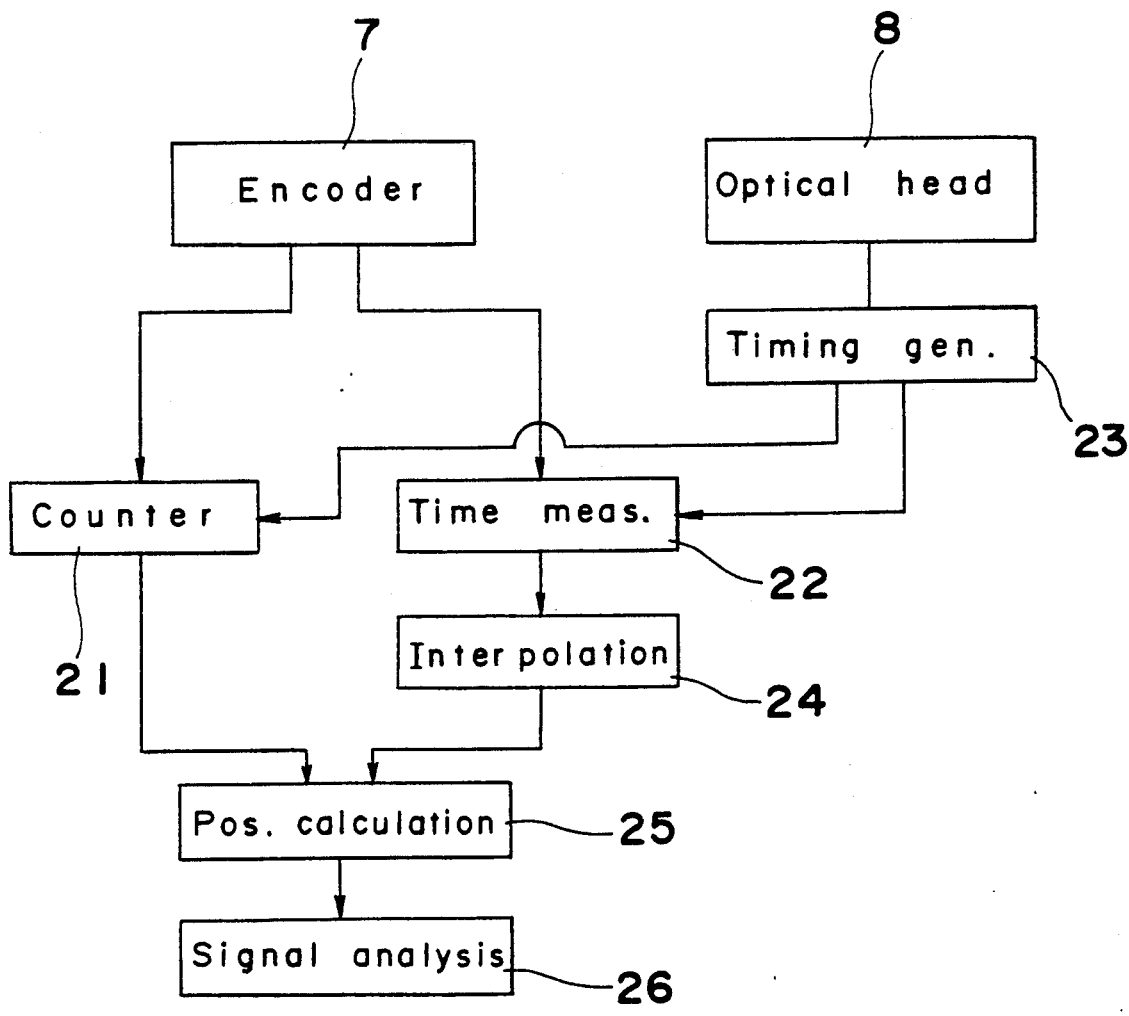
FIG. 2 is a block diagram of a detection signal processing circuit in an inspection apparatus for a laser disk, according to one embodiment of the present invention.
Figure 3:
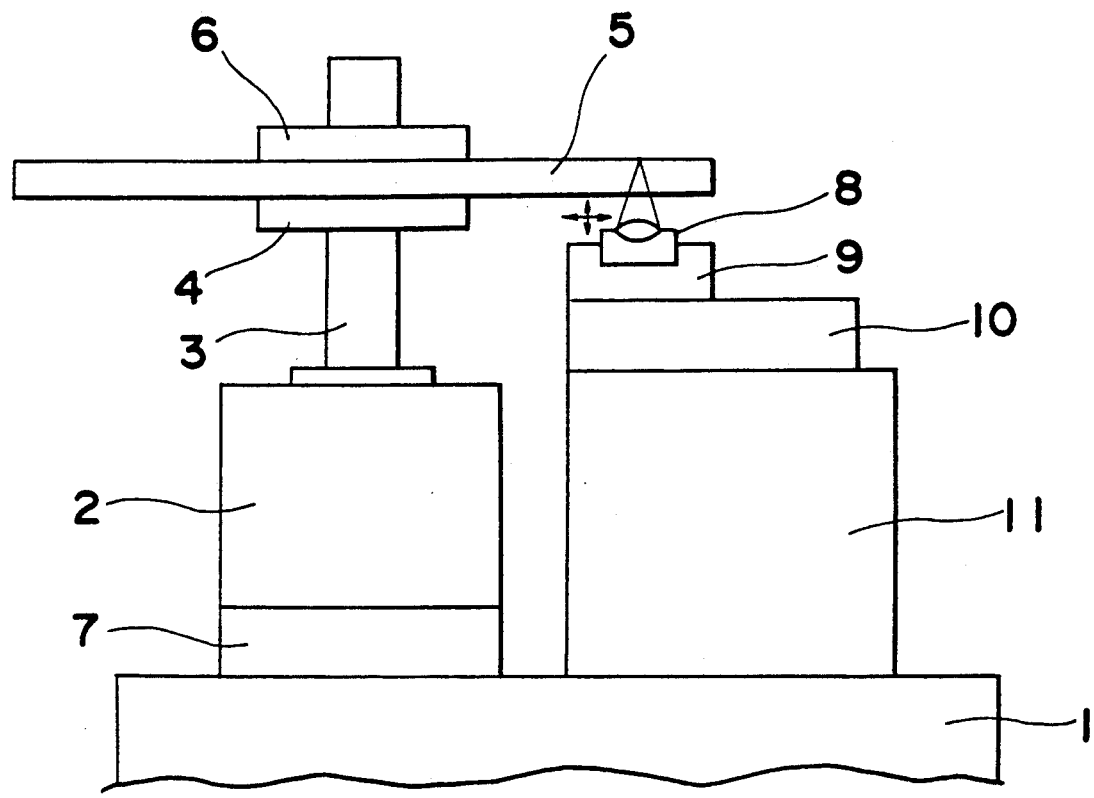
FIG. 3 is a schematic view of the inspection apparatus of FIG. 2.

Then, a circuit for processing a detection signal outputted from the optical head 8 is described with reference to FIG. 2. Detection signals of square wave are outputted from the encoder 7 so as to be applied to a counter 21 and a time measuring means 22, respectively. Meanwhile, the detection signal from the optical head 8 is inputted to a timing generator 23 and the timing generator 23 outputs timing signals to the counter 21 and the time measuring means 22 at the time of rise or fall of the detection signal from the optical head 8. The counter 21 counts the number of pulses from the encoder 7 and outputs to a position calculating means 25, a value of the number of pulses assumed at the time of input of the timing signal to the counter 21. On the other hand, the time measuring means 22 measures a period T of the detection signal from the encoder 7 and a duration A from a time point of detection of a reference phase to a time point of input of the timing signal from the timing generator 23 to the time measuring means 22 so as to output values of the period T and the duration A to an interpolation means 24. In the interpolation means 24, a value of (A/T) is calculated from the period T and the duration T so as to be outputted to the position calculating means 25. In the position calculating means 25, position for each pulse signal is detected by the signal from the counter 21 and position between the pulse signals is calculated by the signal from the interpolation means 24. The arithmetic result of the position calculating means 25 represents position of a bit written on the laser disk 5 and is inputted to a signal analyzer 26 in which the arithmetic result of the position calculating means 25 is analyzed.

As described above, the detection signal outputted from the optical head 8 is detected in correspondence with accurate rotational position of the laser disk 5. Therefore, even if minute nonuniform rotations of the laser disk 5 which is adapted to be rotated at uniform speed by the PLL control means 17 happen, position of a bit written on the laser disk 5 can be inspected at remarkably high precision. Meanwhile, since the pulse signal from the encoder 7 is time-shared so as to have high resolution, such a phenomenon does not take place that the pulse signal is affected by accuracy of its wave form as in the case where the pulse signal is counted after having been converted into a high pulse signal by using a multiplier. As a result, position of a bit written on the laser disk 5 can be detected at high precision. Consequently, it becomes possible by the simple circuit arrangement to highly accurately detect position of a bit of the laser disk 5 in excellent response characteristics.

Meanwhile, in this embodiment, the present invention is applied to the inspection apparatus for inspecting position of a bit written on the laser disk. However, the present invention can also be applied to an apparatus for writing bits on the laser disk. In this case, since positions of bits written on the laser disk are controlled at high precision, an inspection process may not be required to be performed. Furthermore, the present invention is not restricted to working or inspection on the laser disk but can also be effectively applied to high precision working on another rotary member or inspection of the worked portions of the rotary member.

In accordance with the present invention, the rotary member is driven for rotation at substantially uniform speed by the rotational drive means controlled by the rotational control means and the processing means for processing the rotary member is controlled on the basis of the position of the rotary member detected by the position detecting means capable of detecting rotational position of the rotary member at high resolution. Thus, even if minute nonuniform rotations of the rotary member happen, the rotary member can be processed at remarkably high positional accuracy. Meanwhile, since minute nonuniform rotations of the rotary member are permissible, the relatively inexpensive damping base of simple construction can be employed for eliminating external vibrations.

Furthermore, in the above mentioned position detecting means having high resolution, not only the pulse signal from the encoder is counted but position between the pulse signals is time-shared such that rotational position of the rotary member is detected. Thus, by the simple and inexpensive circuit arrangement, rotational position of the rotary member can be detected in necessary response characteristics at high resolution and at high precision. In addition, such an undesirable phenomenon does not take place that the signal outputted from the encoder is affected by accuracy of its wave form as in the case where the signal outputted from the encoder is multiplied so as to have higher resolution.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An apparatus for controlling a rotary member, comprising:
    a rotational drive means for driving the rotary member so as to rotate the rotary member about an axis of the rotary member;
    an encoder for detecting a rotational position of said rotational drive means;
    a control means for controlling, in response to an output signal of said encoder, said rotational drive means so as to rotate said rotational drive means at a uniform speed;
    a processing means for processing an arbitrary position of the rotary member rotating at the uniform speed;
    a position detecting means for detecting, on the basis of the output signal of said encoder, a rotational position of the rotary member by raising a resolution of the output signal of said encoder; and
    a processing control means for controlling said processing means on the basis of the rotational position of the rotary member detected by said position detecting means.

2. An apparatus for controlling a rotary member, comprising:
    a rotational drive means for driving the rotary member so as to rotate the rotary member about an axis of the rotary member;
    an encoder for detecting a rotational position of said rotational drive means;
    a control means for controlling, in response to an output signal of said encoder, said rotational drive means so as to rotate said rotational drive means at a uniform speed;
    a processing means for processing an arbitrary position of the rotary member rotating at the uniform speed;
    a position detecting means for detecting, on the basis of the output signal of said encoder, a rotational position of the rotary member by raising a resolution of the output signal of said encoder; and
    a processing control means for controlling an output signal of said processing means on the basis of the rotational position of the rotary member detected by said position detecting means.

3. An apparatus as claimed in claim 1, wherein said position detecting means includes a counter for counting pulse signals outputted from said encoder, an interpolation means for performing interpolation between the pulse signals from a duration and a period of the pulse signals and a position calculating means for calculating the rotational position of the rotary member on the basis of output signals of said counter and said interpolation means.

4. An apparatus as claimed in claim 2, wherein said position detecting means includes a counter for counting pulse signals outputted from said encoder, an interpolation means for performing interpolation between the pulse signals from a duration and a period of the pulse signals and a position calculating means for calculating the rotational position of the rotary member on the basis of output signals of said counter and said interpolation means.

* * * * *